US011539389B2

(12) United States Patent
Goto et al.

(10) Patent No.: US 11,539,389 B2
(45) Date of Patent: Dec. 27, 2022

(54) SINGLE CHANNEL RECEIVER AND RECEIVING METHOD

(71) Applicant: Sony Semiconductor Solutions Corporation, Kanagawa (JP)

(72) Inventors: Yuken Goto, Stuttgart (DE); Martin Fritz, Stuttgart (DE)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 0 days.

(21) Appl. No.: 17/281,581

(22) PCT Filed: Nov. 28, 2019

(86) PCT No.: PCT/EP2019/082873
§ 371 (c)(1),
(2) Date: Mar. 31, 2021

(87) PCT Pub. No.: WO2020/109453
PCT Pub. Date: Jun. 4, 2020

(65) Prior Publication Data
US 2021/0367635 A1 Nov. 25, 2021

(30) Foreign Application Priority Data
Nov. 29, 2018 (EP) .................... 18 209 196

(51) Int. Cl.
*H04B 1/16* (2006.01)
*H04L 7/033* (2006.01)
(52) U.S. Cl.
CPC ............. *H04B 1/16* (2013.01); *H04L 7/0331* (2013.01)
(58) Field of Classification Search
CPC . H04L 7/0331; H04L 27/0014; H04L 27/106; H04L 27/1563; H04L 27/2014;
(Continued)

(56) References Cited

U.S. PATENT DOCUMENTS 4,570,125 A * 2/1986 Gibson ............... H04L 27/1525
375/328
8,295,404 B1 * 10/2012 Husted ................ H04L 27/2335
375/329
(Continued)

FOREIGN PATENT DOCUMENTS

EP 2905905 A1 8/2015

OTHER PUBLICATIONS

Lui et al, "An ADPLL-Centric Bluetooth Low-Energy Transceiver with 2.3mW Interference-Tolerant Hybrid-Loop Receiver and 2.9mW Single-Point Polar Transmitter in 65nm CMOS", 2018 IEEE International Solid-State Circuits Conference, Feb. 14, 2018 (Year: 2018).*

(Continued)

*Primary Examiner* — Aristocratis Fotakis
(74) *Attorney, Agent, or Firm* — Xsensus LLP

(57) ABSTRACT

A single channel receiver includes an input terminal that receives an analog input signal, a mixer that down-mixes the analog input signal by use of a phase- and/or frequency-corrected oscillator frequency signal and shifts complex-valued information contained in the analog input signal to the real part (or alternatively to the imaginary part) to obtain an intermediate real-valued analog signal, an analog-to-digital-converter that converts the intermediate analog signal into an intermediate digital signal, a demodulator that demodulates the intermediate digital signal into a digital output signal, a phase tracking loop that detects zero-crossings in the intermediate digital signal to obtain phase error information representing a phase error in the intermediate digital signal, and an oscillator that generates the phase- and/or frequency-corrected oscillator frequency signal by compensating the phase and/or frequency error in the
(Continued)

intermediate digital signal by correcting the phase of the oscillator frequency signal with the phase error information.

20 Claims, 7 Drawing Sheets

(58) Field of Classification Search
CPC ......... H04L 27/2337; H04L 2027/0026; H04L 2027/0055; H04L 2027/0063
See application file for complete search history.

(56) References Cited

U.S. PATENT DOCUMENTS

| | | | |
|---|---|---|---|
| 2004/0161022 A1* | 8/2004 | Glazko | H04B 1/712 375/152 |
| 2007/0024477 A1 | 2/2007 | Xu et al. | |
| 2008/0062029 A1 | 3/2008 | Changqing et al. | |
| 2010/0067634 A1* | 3/2010 | Furman | H03L 7/0807 455/226.1 |
| 2012/0099607 A1* | 4/2012 | Cariou | H04L 27/261 375/316 |
| 2016/0182066 A1* | 6/2016 | Ta | H04L 27/2657 331/1 R |
| 2017/0063584 A1* | 3/2017 | Taniguchi | H04L 27/227 |
| 2017/0134198 A1 | 5/2017 | Okuni et al. | |
| 2017/0141855 A1* | 5/2017 | Ryu | H04B 7/18519 |

OTHER PUBLICATIONS

Ye Zhang, "Low Power RF Signal Processing for Internet of Things Applications", Master of Science, Thesis, Dec. 2016 (Year: 2016).*

International Search Report and Written Opinion dated Jan. 27, 2020, received for PCT Application PCT/EP2019/082873, Filed on Nov. 28, 2019, 12 pages.

Wang et al., A 25Gbps, 2x-Oversampling CDR Using a Zero-Crossing Linearizing Phase Detector, IEEE Radio Frequency Integrated Circuits Symposium, RM04D-1, 2014, pp. 271-274.

Sony Europe Limited, "Documentation for Single Channel BLE Receiver Investigations", EuTEC, Version: 1.000, Apr. 11, 2018, pp. 1-48.

Liu et al., "An ADPLL-Centric Bluetooth Low-Energy Transceiver with 2.3mW Interference-Tolerant Hybrid-Loop Receiver and 2.9mW Single-Point Polar Transmitter in 65nm CMOS", IEEE International Solid-State Circuits Conference, Session 28, Wireless Connectivity, Feb. 14, 2018, pp. 444-445.

Ding et al., "A 0.8V 0.8mm2 Bluetooth 5/BLE Digital-Intensive Transceiver with a 2.3mW Phase-Tracking RX Utilizing a Hybrid Loop Filter for Interference Resilience in 40nm CMOS", IEEE International Solid-State Circuits Conference, Session 28, Wireless Connectivity, Feb. 14, 2018, pp. 446-447.

Sai et al., "A 5.5 mW ADPLL-Based Receiver With a Hybrid Loop Interference Rejection for BLE Application in 65nm CMOS", IEEE Journal of Solid-State Circuits, 2016, pp. 1-12.

Liu et al., "A 1.2 nJ/bit 2.4 GHz Receiver With a Sliding-IF Phase-to-Digital Converter for Wireless Personal/Body Area Networks", IEEE Journal of Solid-State Circuits, vol. 49, No. 12, Dec. 2014, pp. 3005-3017.

Prummel et al., "A 10 mW Bluetooth Low-Energy Transceiver With On-Chip Matching", IEEE Journal of Solid-State Circuits, 2015, pp. 3077-3087.

* cited by examiner

SINGLE CHANNEL RECEIVER AND RECEIVING METHOD

CROSS-REFERENCE TO RELATED APPLICATIONS

The present application is based on PCT filing PCT/EP2019/082873, filed Nov. 28, 2019, which claims priority to European Patent Application 18209196.7 filed by the European Patent Office on Nov. 29, 2018, the entire contents of each being incorporated herein by reference.

BACKGROUND

Field of the Disclosure

The present disclosure relates to a single channel receiver and a single channel receiving method.

Description of Related Art

A typical FSK/MSK (Frequency Shift Keying/Minimum Shift Keying) I/Q receiver achieves a very good performance at relatively low power consumption. Especially a properly designed digital part has already very low power consumption which can be further reduced by introduction of smaller process technologies. However, the analog components represent the major power consumption in the receiver and will not benefit from future smaller process technology.

Conventional FSK/MSK I/Q receivers typically require that a complex-valued analog signal is generated from the received real-valued analog input signal in order to recover from the real-valued analog input signal complex-valued information which was originally generated at the transmitter side. For processing the complex-valued analog signal two (analog and digital) processing branches (receive channels) are required.

The "background" description provided herein is for the purpose of generally presenting the context of the disclosure. Work of the presently named inventor(s), to the extent it is described in this background section, as well as aspects of the description which may not otherwise qualify as prior art at the time of filing, are neither expressly or impliedly admitted as prior art against the present disclosure.

SUMMARY

It is an object to provide a receiver and a receiving method, especially for frequency modulated signals, having a reduced overall (and especially analog) power consumption. Preferably, the BLE (Bluetooth Low Energy) 5.0 standard specification shall be fulfilled.

It is a further object to provide a corresponding computer program for implementing the single channel receiving method and a non-transitory computer-readable recording medium for implementing the single channel receiving method.

According to an aspect there is provided a single channel receiver comprising
- an input terminal configured to receive an analog input signal,
- a mixer configured to down-mix the analog input signal by use of a phase- and/or frequency-corrected oscillator frequency signal and to shift complex-valued information contained in the analog input signal to the real part to obtain an intermediate real-valued analog signal,
- an analog-to-digital-converter configured to convert the intermediate real-valued analog signal into an intermediate digital signal,
- a demodulator configured to demodulate the intermediate digital signal into a digital output signal,
- a phase tracking loop configured to detect zero-crossings in the intermediate digital signal to obtain phase error information representing a phase error in the intermediate digital signal, and
- an oscillator configured to generate the phase- and/or frequency-corrected oscillator frequency signal by use of the phase error information.

According to a further aspect there is provided a single channel receiving method comprising
- receiving an analog input signal,
- down-mixing the analog input signal by use of a phase- and/or frequency-corrected oscillator frequency signal,
- shifting complex-valued information contained in the analog input signal to the real part to obtain an intermediate real-valued analog signal,
- converting the intermediate analog signal into an intermediate digital signal,
- demodulating the intermediate digital signal into a digital output signal,
- detecting zero-crossings in the intermediate digital signal to obtain phase error information representing a phase error in the intermediate digital signal, and
- generating the phase- and/or frequency-corrected oscillator frequency signal by use of the phase error information.

According to a further aspect there is provided a single channel receiver comprising
- an input terminal configured to receive an analog input signal,
- a mixer configured to down-mix the analog input signal by use of a phase- and/or frequency-corrected oscillator frequency signal and to shift complex-valued information contained in the analog input signal to the imaginary part to obtain an intermediate real-valued analog signal,
- an analog-to-digital-converter configured to convert the intermediate analog signal into an intermediate digital signal,
- a demodulator configured to demodulate the intermediate digital signal into a digital output signal,
- a phase tracking loop configured to detect zero-crossings in the intermediate digital signal to obtain phase error information representing a phase error in the intermediate digital signal, and
- an oscillator configured to generate the phase- and/or frequency-corrected oscillator frequency signal by use of the phase error information.

According to a further aspect there is provided a single channel receiver comprising
- receiving an analog input signal,
- down-mixing the analog input signal by use of a phase- and/or frequency-corrected oscillator frequency signal,
- shifting complex-valued information contained in the analog input signal to the imaginary part to obtain an intermediate real-valued analog signal,
- converting the intermediate analog signal into an intermediate digital signal,
- demodulating the intermediate digital signal into a digital output signal,
- detecting zero-crossings in the intermediate digital signal to obtain phase error information representing a phase error in the intermediate digital signal, and generating the phase- and/or frequency-corrected oscillator frequency signal by use of the phase error information.

According to still further aspects a computer program comprising program means for causing a computer to carry out the steps of the method disclosed herein, when said computer program is carried out on a computer, as well as a non-transitory computer-readable recording medium that stores therein a computer program product, which, when executed by a processor, causes the method disclosed herein to be performed are provided.

Embodiments are defined in the dependent claims. It shall be understood that the disclosed method, the disclosed computer program and the disclosed computer-readable recording medium have similar and/or identical further embodiments as the claimed receiver and as defined in the dependent claims and/or disclosed herein.

The present disclosure particularly relates to a single channel receiver for binary frequency shift keying modulation which exploits special properties of the modulation. The complex-valued information which was originally generated at the transmitter side and which is contained in the (real-valued) analog receiver input signal is shifted only, or substantially only, to the real part (or (substantially) only to the imaginary part), so that an intermediate real-valued analog signal containing sufficient information to recover the full bit information in the real (or imaginary) part can be obtained. This is accomplished by mixing the received RF signal to a certain offset frequency. Thus, the complex-valued information contained in the analog receiver input signal can be recovered at the receiver in one single channel. By use of such a single channel approach, i.e., by use of only one receive channel instead of two receive channels as used in conventional FSK/MSK I/Q receivers, the desired power reduction can be achieved due to the reduced number of analog components. The disclosed single channel receiver operates on purely real-valued signals.

The disclosed single channel receiver is a coherent receiver. Phase and/or frequency effects present in the received signal are tracked and compensated by applying a phase tracking loop. It estimates phase errors based on zero-crossing detection. The obtained phase errors may in one embodiment be fed to a loop filter, which obtains the corresponding phase and/or frequency error to be corrected. The phase and/or frequency correction signal may be fed to the oscillator to adjust the mixer phase and frequency correspondingly to compensate the phase- and/or frequency error.

Additionally, synchronization of the transmitter and receiver sample timing is preferred. Especially for reception of long packets, an additional sample timing offset tracking is desired. This is accomplished in an embodiment by a decision directed sample timing tracking loop (also called timing error loop herein), which is based on estimating signal shape distortions related to sample timing offset The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWING

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1:
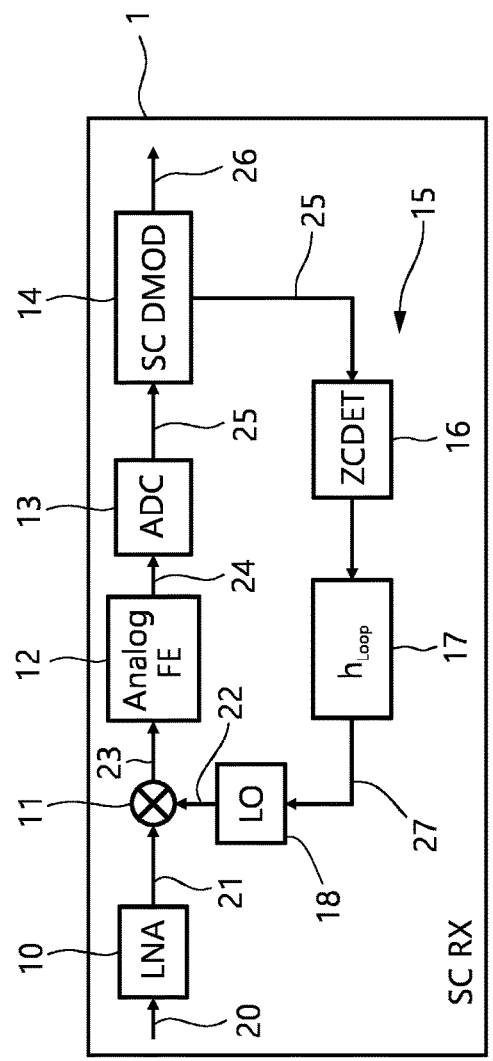
FIG. 1 shows a schematic diagram of a first embodiment of a single channel receiver according to the present disclosure.

Referring now to the drawings, wherein like reference numerals designate identical or corresponding parts throughout the several views, FIG. 1 shows a schematic diagram of a first embodiment of a single channel receiver 1 (SC RX) according to the present disclosure. It comprises an input terminal 10 for receiving an analog input signal 20, in this embodiment an amplifier, e.g. a low noise amplifier (LNA), for amplifying the input signal. A mixer 11 downmixes the (amplified) analog input signal 21 by use of a phase- and/or frequency-corrected oscillator frequency signal 22 and shifts the complex-valued information contained in the (amplified) analog input signal 21 only, or substantially only, to the real part (or, alternatively, to the imaginary part) to obtain an intermediate real-valued analog signal 23. That is, by shifting all the complex-valued information contained in the analog input signal 21 to the real (or imaginary) part, all relevant information (the full differential information) is contained in a single component (in the real part or the imaginary part) and can be recovered using a real-valued intermediate analog signal. In contrast, conventional solutions generate a complex-valued intermediate analog signal in order to recover the complex-valued information contained in the analog input signal.

Referring back to FIG. 1, an optional analog front end (FE) 12 may include for example one or several filter stages and gain stages to properly adjust the intermediate analog signal 23 for the analog-to-digital converter (ADC) 13. The ADC 13 converts the (adjusted) intermediate analog signal 24 into an intermediate digital signal 25. A demodulator 14, preferably a single-channel demodulator (SC DMOD), demodulates the intermediate digital signal 25 into a digital output signal 26.

A phase tracking loop 15, in this embodiment comprising a zero-crossing detector (ZCDET) 16 and a loop filter ($h_{Loop}$) 17, detects zero-crossings in the intermediate digital signal 25 to obtain phase error information 27 representing a phase error in the intermediate digital signal. Finally, a local oscillator (LO) 18 generates the phase- and/or frequency-corrected oscillator frequency signal 22 by use of the phase error information.

In this embodiment, after the LNA 10, the analog input signal 21 is mixed down to a very low intermediate frequency by the single channel RF mixer 11, which shifts all information to the real axis in a signal constellation diagram. After the ADC 13, the intermediate digital signal 25 is fed to the single channel demodulator 14, which outputs the final bit decisions as digital output signal 26. Within the single channel demodulator 14 a suitable signal (a digital representation of the analog input signal) is fed back via the phase tracking loop 15 to the local oscillator 18. For example, the single channel demodulator 14 may reduce the frequency of the intermediate digital signal 25 in two stages, from an ADC rate at the output of the ADC 13 to a signal processing rate after a first stage and to a symbol rate after a second stage. In this case, the intermediate digital signal 25 (at ADC rate), or the (processed) intermediate digital signal after the first stage (at signal processing rate), or even the (further processed) intermediate digital signal at symbol rate (which may correspond to the digital output signal 26; but resolution may be rather coarse if a signal at symbol rate is used could be used). In the example of FIG. 1, the intermediate digital signal 25 at ADC rate is used.

The phase tracking thus adjusts the oscillator's phase in such a way that any detected phase and frequency deviations are de-rotated, e.g. phase offset, frequency drift, etc., so that any phase and frequency errors are tried to be corrected on average. The oscillator phase and frequency is controlled by the phase tracking loop 15, using the estimated phase error as the correcting variable signal.

The disclosed single channel receiver uses a similar architecture as a typical FSK/MSK I/Q receiver to achieve a comparable sensitivity and adjacent channel rejection (ACR) performance. The power reduction is achieved by a single channel approach, i.e. only using one receive channel instead of two. It operates on purely real valued signals.

For single channel reception a coherent receiver concept is used. Therefore, it may be necessary to track the carrier phase and carrier frequency constantly during the whole packet reception. Since a real-valued signal does not have any direct phase information, a new phase error tracking concept is used according to the present disclosure.

In an embodiment, the transmitter and receiver sampling clock offset may be tracked at the receiver as well to guarantee correct reception for long packets. Current I/Q based receivers use an ad-hoc feedback scheme for MSK type modulations, which requires complex signal information. In contrast, an embodiment of the disclosed single channel receiver may use a new approach for timing error tracking.

Figure 2:
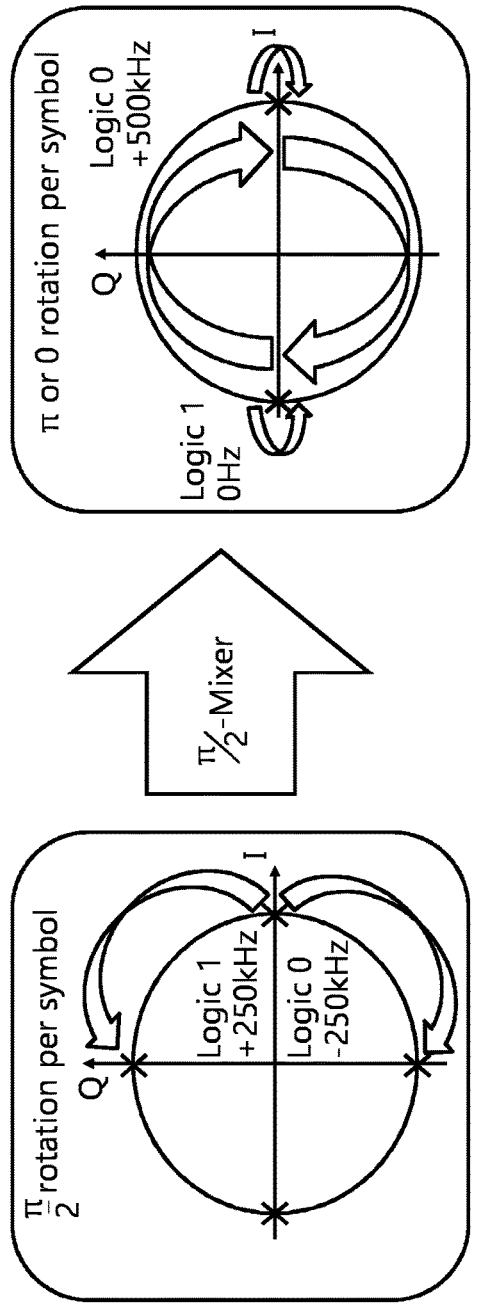
FIG. 2 shows a diagram illustrating the function of a mixer used in the receiver according to the present disclosure.

As mentioned above, to enable single channel reception, the information on symbol rate is shifted fully to one axis in a constellation diagram, i.e. the complex-valued information of the (amplified) analog input signal 21 is shifted (substantially) only to the real or imaginary part to obtain the intermediate real-valued analog signal 23. This may be accomplished by an offset mixer scheme as illustrated in FIG. 2 showing a diagram illustrating the function of the mixer 11.

FIG. 2A shows the constellation diagram of a received analog input signal at the input of the mixer 11. It also shows the possible signal state transitions for the positive I-constellation point as an example. The binary FSK performs a −250 kHz shift for logic 0 and +250 kHz for logic 1, i.e. $\mp\pi/2$ phase rotation on symbol rate. This also means that the signal information rotates between real (I) and imaginary (Q) axis.

FIG. 2B shows the constellation diagram mixer output and all possible signal transitions. The mixer 11 performs a ±250 kHz shift (FIG. 2B shows a −250 kHz shift), thus the output signal either rotates by $\mp\pi$ (i.e. double the phase) per symbol or it does not change in phase. As can be seen, the information at the mixer output is shifted to the real axis (I) and consequently can be received using only one single real valued channel. This assumes an already phase synchronized signal, since the initial phase shall start on the real axis in this example.

In an embodiment, after selecting the real part of the mixer output, the signal may be filtered and down converted by several stages, to guarantee a certain frequency selectivity of the system. For instance, at first it may be filtered by an 48-times oversampled IIR filter, representing the overall analog frontend filter characteristic. In the following the signal may be 4-times down-converted to ADC rate of 12 MHz. Afterwards, the signal may be filtered by first single channel FIR channel filter on 12 MHz rate, down-converted to signal processing rate (4 MHz) and filtered by the second FIR channel filter. Finally, the signal may be down-converted to symbol rate (1 MHz), hard decided and differentially decoded. The differential decoder is provided since the signal at mixer output contains the differential information of the original bit sequence.

Figure 3:
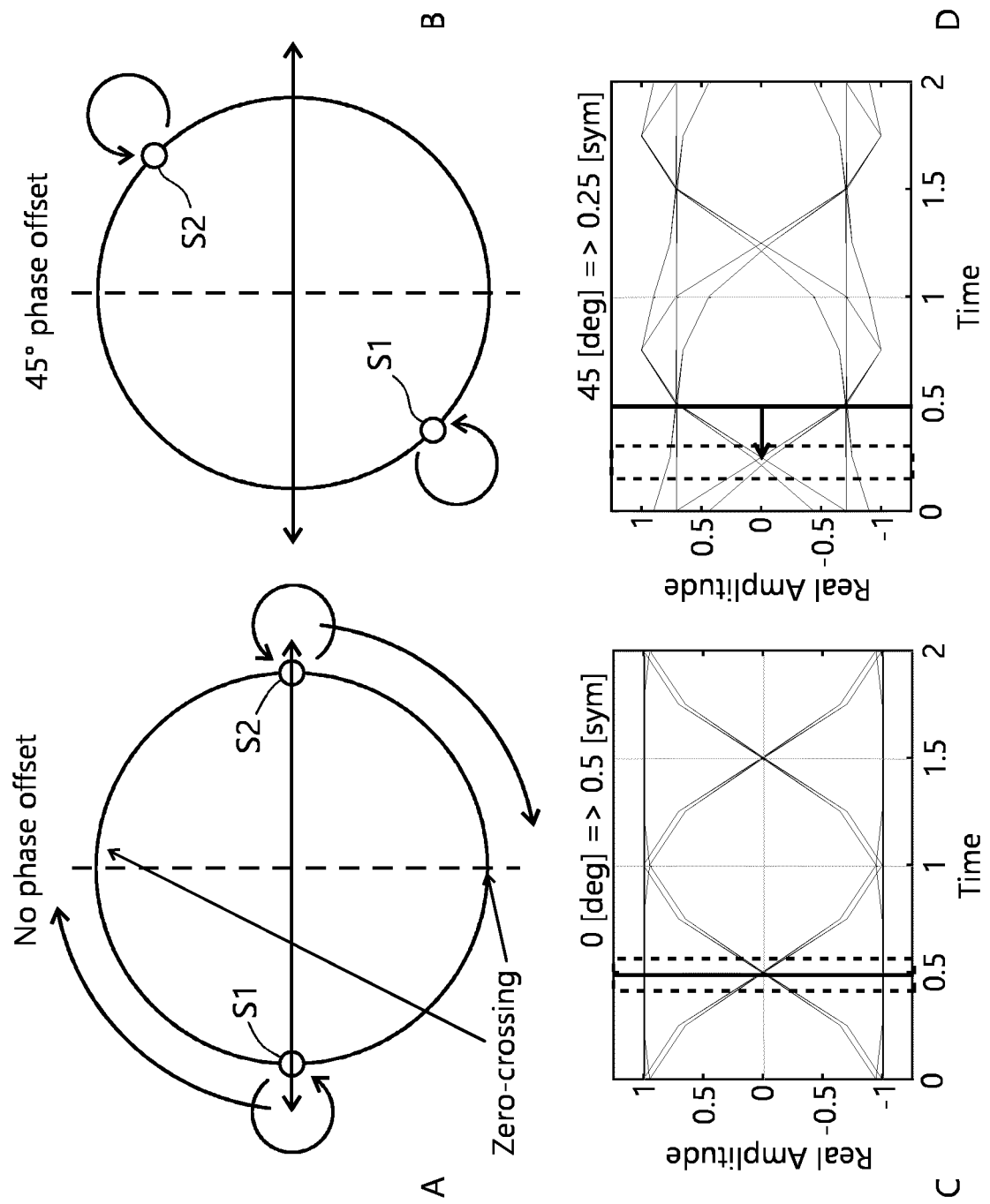
FIG. 3 shows diagrams illustrating the detection of phase error information by zero-crossing detection used in an embodiment according to the present disclosure.

Since a coherent receiver concept is used for single channel reception, phase and frequency are tracked constantly during the duration of packet reception. In an embodiment the phase tracking algorithm is based on the location of zero-crossings between consecutive symbols, relative to the sample timing grid. The concept of ZCDET is illustrated in FIG. 3 showing diagrams illustrating the detection of phase error information by zero-crossing detection. In an exemplary implementation a proportional integral (PI) filter may be used as loop filter, but in general any type of loop control filter may be applied, e.g. adaptive filter concepts or model predictive control (MPC) concepts, etc.

A loop filter is controlling the compensation based on an error measurement. In the simplest case it is just a factor, which defines the phase error correction speed. If frequency error also shall be tracked, a parallel integral branch with its own control factor may be included as well. There are generally many different types of loop filters which may be applied according to the present disclosure.

The single channel receiver operates only on real-valued signals, i.e. no direct phase information is available. The zero-crossing detector 16 acts as a phase error detector by detecting the zero-crossings in the intermediate digital signal 25 or an oversampled version thereof. It estimates the phase error of two consecutive symbols S1 and S2 (which have a zero-crossing between each other), based on the timing shift of the zero-crossing from the middle timing between the two consecutive symbols. The phase error is zero if the zero-crossing is exactly in the middle timing position between the two consecutive symbols S1 and S2, as shown in the constellations depicted in FIG. 3A and the corresponding zero-crossing timing depicted in FIG. 3C. If the zero-crossing deviates to the previous symbol there is a value unequal to zero outputted which is proportional to the corresponding phase offset present in the signal, as shown in the constellations with phase offset of 45° depicted in FIG. 3B and zero-crossing timing in such a case depicted in FIG. 3D. If the zero-crossing deviates to the next symbol a value unequal to zero is outputted with opposite sign, which again is proportional to the phase error.

The amount of the deviation of the zero-crossing from the middle position may be determined by evaluating the relation between the amplitudes of the two consecutive symbols. Without loss of generality the assumption for an ideal symbol transition is that at previous symbol timing the amplitude has the value +x and the amplitude at the next symbol timing has the value −x. By comparing and normalizing the actual amplitude values to the expected value x, a timing offset value is obtained which is proportional to the phase error.

In other words, the absolute zero-crossing offset from its optimal symmetric 0° phase offset position can be estimated based on amplitude differences of consecutive samples. The zero-crossing detector 16 detects a zero-crossing between samples at time instance n−2 and n−1, if samples n−3 and n−2 have opposite sign than samples at n−1 and n, where n is the sample index of the current sample (e.g. 4 MHz rate). Based on the amplitude difference between sample n−2 and n−1, the zero-crossing between these 2 samples is estimated in terms of fraction of symbol period. The sample timing grid is used as additional information, to obtain the offset direction, i.e. positive or negative phase offset.

A PI-filter may be used as loop filter to control the phase error compensation. It may comprise a proportional (P) and an integral (I) branch, which respectively can correct a constant phase and frequency error ideally to zero. For any higher order effect (e.g. frequency drift) a PI-filter is not optimal, since it can never correct the error ideally to zero. P- and I-gain may be designed in advance and then set as fixed constant system gains for simulations.

Figure 4:
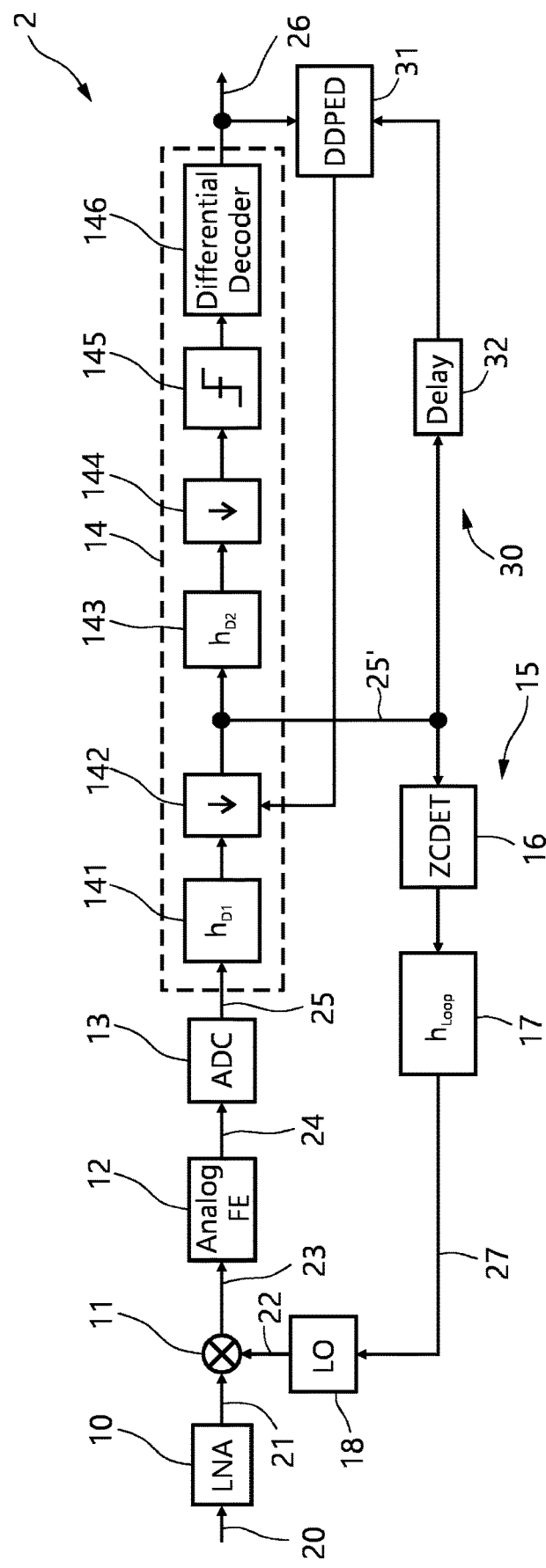
FIG. 4 shows a schematic diagram of a second embodiment of a single channel receiver according to the present disclosure.

FIG. 4 shows a schematic diagram of a second embodiment of a single channel receiver2 according to the present disclosure. In this embodiment an additional timing tracking loop 30 is provided that is configured to detect signal shape distortions in the digital output signal 26 to obtain timing error information representing a sample timing error in the digital output signal 26.

After the ADC 13, the intermediated digital signal 25 is decimated in two stages from some ADC rate to some signal processing rate and finally to the symbol rate. Suppression of aliasing and further out-of-band interferers is accomplished in both decimation stages by the digital filters 141 ($h_{D1}$) and 143 ($h_{D2}$), respectively, each followed by a respective down-sampling stage 142 and 144, respectively. Finally, the bits are detected in a hard decision detector 145 and differentially decoded by a differential decoder 146. The differential decoder 146 is preferably provided due to the applied offset mixer concept. The phase tracking feedback 25' is shown after the first digital filter 141 and the first down-sampling stage 142, but the feedback may also be taken at any other suitable point in the single channel demodulator 14.

For single channel reception of long packets in particular long BLE packets, a timing error caused by clock frequency offset results in significant performance degradation as sampling timing error increases towards the end of a packet. Since zero-crossing timing is already used for phase error detection, another indicator is used for sampling offset. In a single channel architecture, the amplitude information of received signal is used to estimate the direction of timing offset, which algorithm may herein be called Decision-Directed Phase Error Detection (DDPED) This phase error detection algorithm is used for timing error detection in this embodiment. Hence, in this embodiment the sample timing offset is additionally be tracked with a separate timing tracking algorithm. This decision directed algorithm is based on measuring (or estimating) signal shape distortions related to sample timing offset. The sample timing offset is estimated in a DDPED detector 31 and compensated in a (fractional) down-sampling stage 142 from ADC rate to signal processing rate. The sample timing compensation may, however, also be done in the second down-sampling stage 144. A delay circuit 32 may be provided to compensate a delay of the elements 143 to 146.

Figure 5:
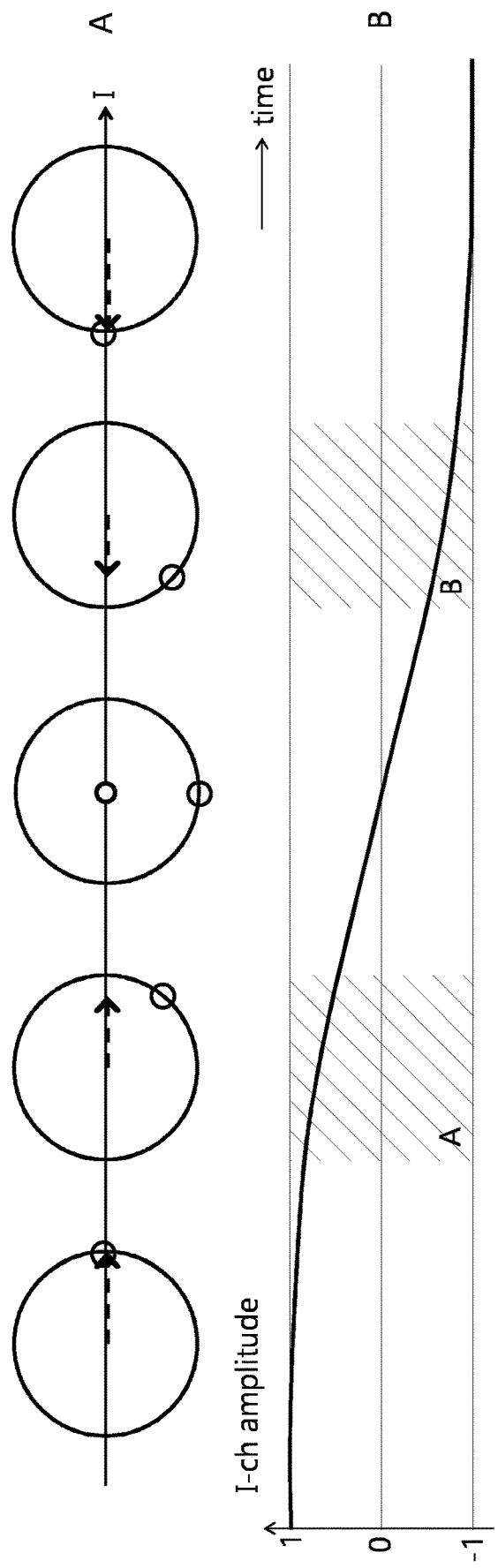
FIG. 5 shows diagrams illustrating the detection of timing error information used in an embodiment according to the present disclosure.
Figure 5:
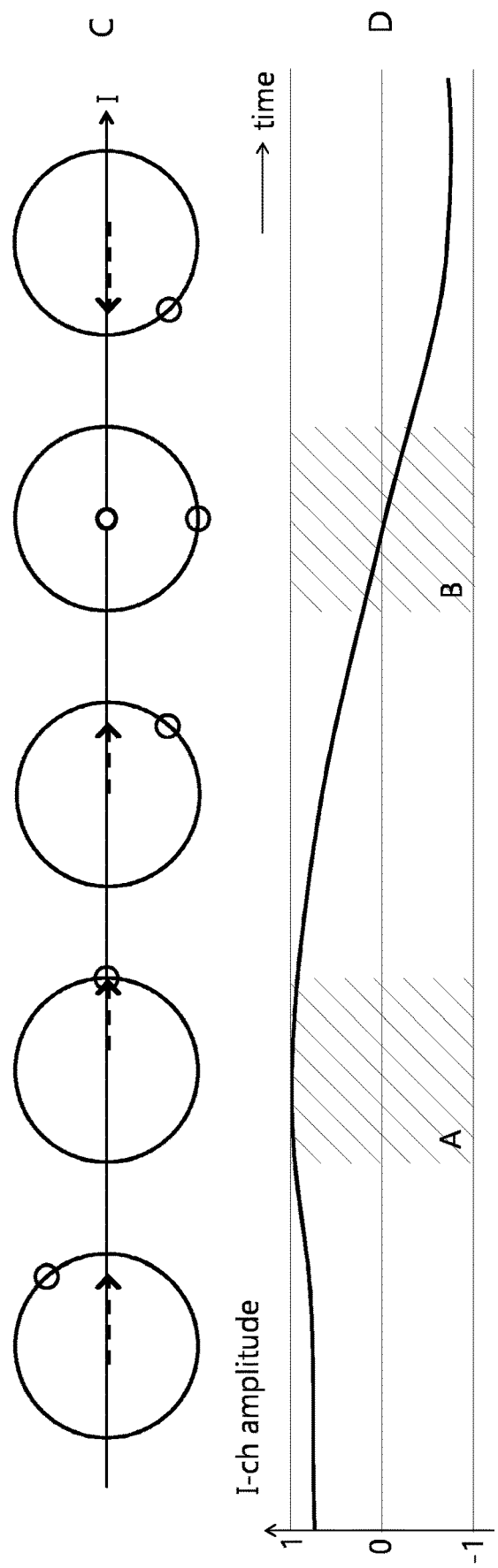

FIG. 5 shows diagrams illustrating the detection of timing error information used in an embodiment according to the present disclosure. FIGS. 5A and 5B particularly show the input signal 20 (FIG. 5A in a constellation diagram and FIG. 5B over time) when there is no phase offset, i.e. the input signal 20 is a synchronized signal. In this case the expected ratio of the average amplitudes of area A and area B are identical. FIGS. 5C and 5D show the input signal 20 (FIG. 5C in a constellation diagram and FIG. 5D over time) when there is a phase offset of −45 degrees. In this case the expected ratio of the average amplitude of area A is larger than that of area B. If the phase offset is in the positive direction, the ratio of area A and area B are reversed, i.e. positive or negative direction of phase offset can be estimated. The timing for measuring amplitude in area A or B may be determined by the transmitted bit sequence. Therefore the decoded bit output of the demodulator 14 is fed to DDPED detector 30 as shown in FIG. 4, which is the reason why the algorithm is called "decision-directed".

The reason why zero-crossing detection (ZCDET) is used for carrier phase error detection and decision-directed phase error detection (DDPED) is used for timing error detection is because of the detectors' reliabilities and required response time. Although DDPED is a direct measure for carrier phase offset, the algorithm may be susceptible of noise and may require a longer averaging window, i.e. it may not be suitable for carrier phase correction because carrier phase correction requires very fast response time and relatively high accuracy. On the other hand, sample timing offset increases very slowly even when there is a maximum 100 ppm clock frequency offset between the transmitter and the receiver, which justifies the use of the DDPED algorithm for timing error correction.

Figure 6:
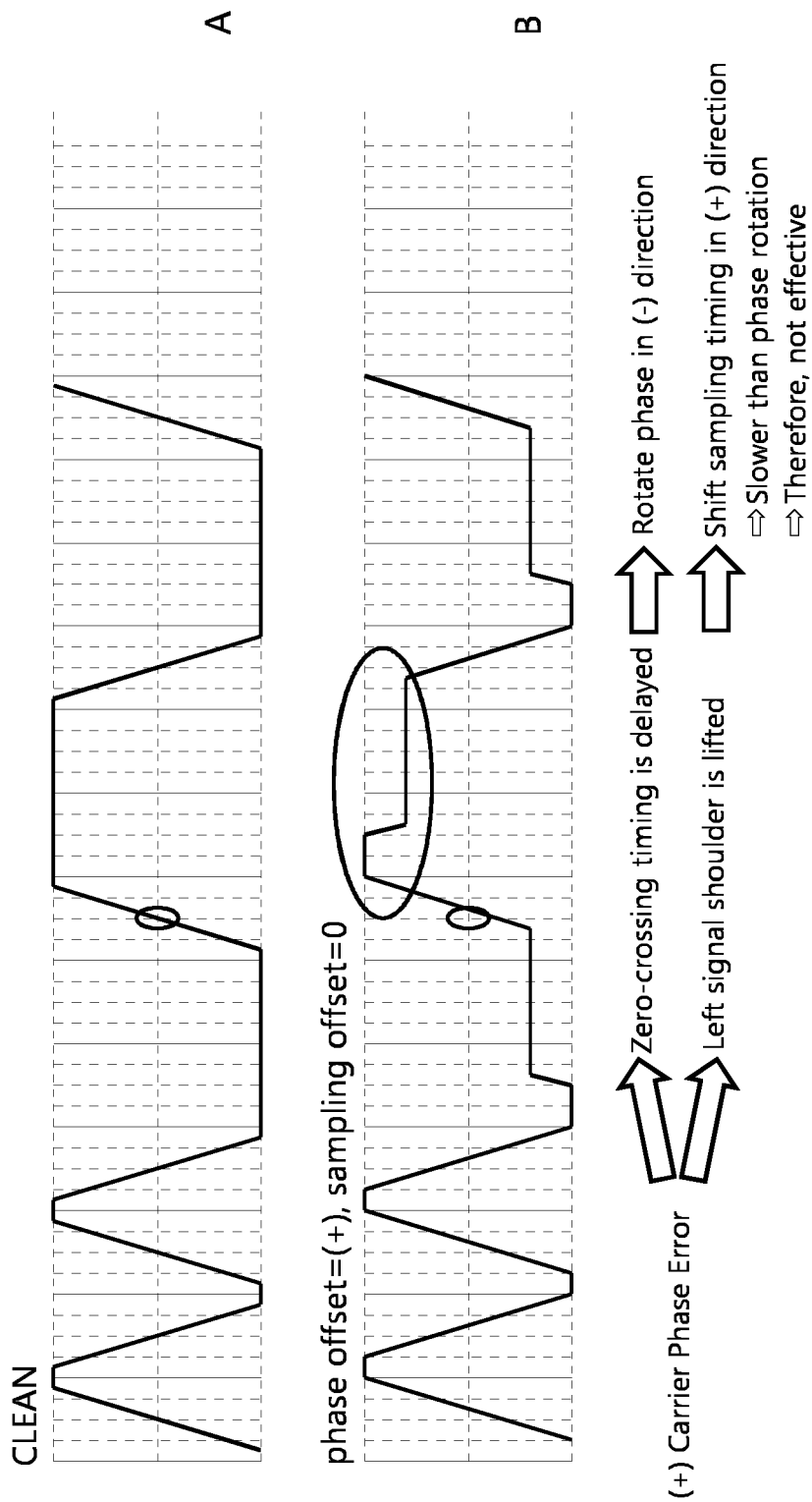
FIG. 6 shows diagrams illustrating a synchronized signal and a signal with phase offset.

FIG. 6 shows diagrams illustrating a synchronized signal and a signal with phase offset As shown in FIG. 6, with the absence of sample timing error (FIG. 6A), a phase offset results in a zero-crossing timing offset, i.e. the ZCDET algorithm can be used for phase error detection. With a zero sample timing error (FIG. 6B), a phase offset results in both zero-crossing timing offset and amplitude imbalance. In this case, the ZCDET algorithm quickly corrects the phase error and the DDPED algorithm will not play any role because its response time is much slower than the ZCDET algorithm.

Figure 7:
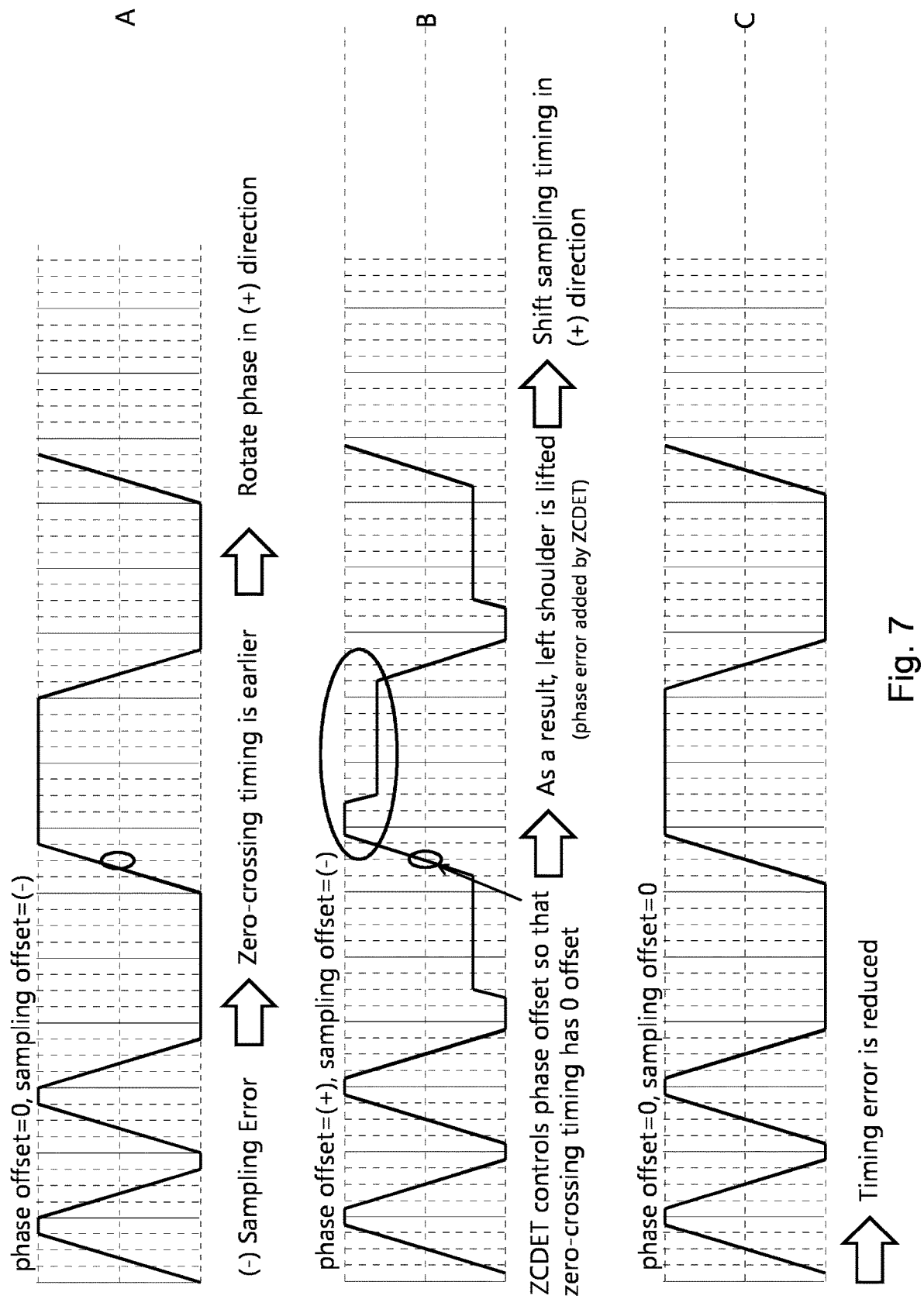
FIG. 7 shows diagrams illustrating the effect of the compensation of phase errors and timing errors.

FIG. 7 shows diagrams illustrating the effect of the compensation of phase errors and timing errors. As shown in FIG. 7, when there is no phase error (FIG. 7A) but there is sampling error (sample timing error) on the received signal, ZCDET reacts on the zero-crossing timing and tries to correct it. As a result, ZCDET produces a residual phase error due to timing error. Then DDPED slowly corrects the residual phase error by correcting timing offset (FIG. 7B).

After some period of time, both carrier phase error and sample timing error are removed as depicted in FIG. 7C. This dual loop structure works for cases with existence of both carrier phase error and sample timing error, i.e. by additionally applying timing offset correction by DDPED, both carrier phase error and sample timing error can be corrected.

With the disclosed concept a reduction of the number of analog components (and thereby a reduction of the overall power consumption) can be achieved compared to a typical I/Q receiver architecture.

Thus, the foregoing discussion discloses and describes merely exemplary embodiments of the present disclosure. As will be understood by those skilled in the art, the present disclosure may be embodied in other specific forms without departing from the spirit or essential characteristics thereof. Accordingly, the disclosure of the present disclosure is intended to be illustrative, but not limiting of the scope of the disclosure, as well as other claims. The disclosure, including any readily discernible variants of the teachings herein, defines, in part, the scope of the foregoing claim terminology such that no inventive subject matter is dedicated to the public.

In the claims, the word "comprising" does not exclude other elements or steps, and the indefinite article "a" or "an" does not exclude a plurality. A single element or other unit may fulfill the functions of several items recited in the claims. The mere fact that certain measures are recited in mutually different dependent claims does not indicate that a combination of these measures cannot be used to advantage.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure. Further, such a software may also be distributed in other forms, such as via the Internet or other wired or wireless telecommunication systems.

The elements of the disclosed devices, apparatus and systems may be implemented by corresponding hardware and/or software elements, for instance appropriated circuits. A circuit is a structural assemblage of electronic components including conventional circuit elements, integrated circuits including application specific integrated circuits, standard integrated circuits, application specific standard products, and field programmable gate arrays. Further a circuit includes central processing units, graphics processing units, and microprocessors which are programmed or configured according to software code. A circuit does not include pure software, although a circuit includes the above-described hardware executing software.

It follows a list of further embodiments of the disclosed subject matter:

1. Single channel receiver comprising:
   an input terminal configured to receive an analog input signal,
   a mixer configured to down-mix the analog input signal by use of a phase- and/or frequency-corrected oscillator frequency signal and to shift complex-valued information contained in the analog input signal to the real part to obtain an intermediate real-valued analog signal,
   an analog-to-digital-converter configured to convert the intermediate analog signal into an intermediate digital signal,
   a demodulator configured to demodulate the intermediate digital signal into a digital output signal,
   a phase tracking loop configured to detect zero-crossings in the intermediate digital signal to obtain phase error information representing a phase error in the intermediate digital signal, and
   an oscillator configured to generate the phase- and/or frequency-corrected oscillator frequency signal by use of the phase error information.

2. Single channel receiver comprising:
   an input terminal configured to receive an analog input signal,
   a mixer configured to down-mix the analog input signal by use of a phase- and/or frequency-corrected oscillator frequency signal and to shift complex-valued information contained in the analog input signal to the imaginary part to obtain an intermediate real-valued analog signal,
   an analog-to-digital-converter configured to convert the intermediate analog signal into an intermediate digital signal,
   a demodulator configured to demodulate the intermediate digital signal into a digital output signal,
   a phase tracking loop configured to detect zero-crossings in the intermediate digital signal to obtain phase error information representing a phase error in the intermediate digital signal, and
   an oscillator configured to generate the phase- and/or frequency-corrected oscillator frequency signal by use of the phase error information.

3. Single channel receiver as defined in embodiment 1 or 2,
   wherein the phase tracking loop comprises a zero-crossing detector configured to detect the timing of zero-crossings between two consecutive symbols of the intermediate digital signal.

4. Single channel receiver as defined in embodiment 3,
   wherein the zero-crossing detector is configured to determine that there is no phase offset if the zero-crossing is arranged in the middle between the two consecutive symbols and to determine that there is a phase offset if the zero-crossing is not arranged in the middle between the two subsequent symbols.

5. Single channel receiver as defined in embodiment 4,
   wherein the zero-crossing detector is configured to determine the phase offset amount by detecting the position of the zero-crossing between the two consecutive symbols.

6. Single channel receiver as defined in embodiment 5,
   wherein the zero-crossing detector is configured to determine the phase offset amount based on the amplitudes of the two consecutive symbols.

7. Single channel receiver as defined in embodiment 6,
   wherein the zero-crossing detector is configured to determine the phase offset amount by comparing and normalizing the amplitudes of the two consecutive symbols to an expected amplitude value to obtain a timing offset value which is proportional to the phase error.

8. Single channel receiver as defined in embodiment 3,
   wherein the phase tracking loop further comprises a loop filter configured to control the phase error compensation.

9. Single channel receiver as defined in any preceding embodiment,
   wherein the mixer is configured to shift the complex-valued information of the analog input signal to the real or imaginary part only by binary phase shift keying.

10. Single channel receiver as defined in any preceding embodiment,
    further comprising a timing tracking loop configured to detect signal shape distortions in the digital output signal to obtain timing error information representing a sample timing error in the digital output signal.

11. Single channel receiver as defined in embodiment 10,
    wherein the timing tracking loop comprises a decision-directed phase error detector configured to compare amplitudes of the digital output signal at predetermined timings between two consecutive symbols of the digital output signal.

12. Single channel receiver as defined in embodiment 11,
    wherein the decision-directed phase error detector is configured to compare amplitudes of the digital output signal after a quarter and after three quarters of the time period between two consecutive symbols of the digital output signal.

13. Single channel receiver as defined in embodiment 11, wherein the decision-directed phase error detector is configured to compare average amplitudes of the digital output signal at predetermined timing periods between two consecutive symbols of the digital output signal.

14. Single channel receiver as defined in embodiment 11, wherein the demodulator comprises a first down-converter configured to down-convert the sampling rate of the intermediate digital signal and/or to re-sample a fractional sampling rate.

15. Single channel receiver as defined in embodiment 14, wherein the first down-converter is configured to down-convert the sampling rate of the intermediate digital signal by use of the timing error information.

16. Single channel receiver as defined in embodiment 14, wherein the demodulator further comprises a second down-converter configured to further down-convert the down-converted sampling rate of the intermediate digital signal down-converted by the first down-converter.

17. Single channel receiver as defined in embodiment 16, further comprising a delay circuit coupled between the output of the first down-converter and the decision-directed phase error detector configured to delay the output signal of the first down-converter.

18. Single channel receiver as defined in embodiment 14, wherein the demodulator further comprises a hard decision detector configured to detect the bits of the digital output signal as hard decision and/or a differential decoder configured to decode the bits of the digital output signal.

19. Single channel receiver as defined in any preceding embodiment, wherein the oscillator is configured to generate the phase- and/or frequency-corrected oscillator frequency signal by compensating the phase and/or frequency error in the intermediate digital signal by correcting the phase of the oscillator frequency signal by use of the phase error information.

20. Single channel receiving method comprising:
receiving an analog input signal,
down-mixing the analog input signal by use of a phase- and/or frequency-corrected oscillator frequency signal,
shifting complex-valued information contained in the analog input signal to the real part to obtain an intermediate real-valued analog signal,
converting the intermediate analog signal into an intermediate digital signal,
demodulating the intermediate digital signal into a digital output signal,
detecting zero-crossings in the intermediate digital signal to obtain phase error information representing a phase error in the intermediate digital signal, and
generating the phase- and/or frequency-corrected oscillator frequency signal by use of the phase error information.

21. Single channel receiving method comprising:
receiving an analog input signal,
down-mixing the analog input signal by use of a phase- and/or frequency-corrected oscillator frequency signal,
shifting complex-valued information contained in the analog input signal to the imaginary part to obtain an intermediate real-valued analog signal,
converting the intermediate analog signal into an intermediate digital signal,
demodulating the intermediate digital signal into a digital output signal,
detecting zero-crossings in the intermediate digital signal to obtain phase error information representing a phase error in the intermediate digital signal, and
generating the phase- and/or frequency-corrected oscillator frequency signal by use of the phase error information.

22. A non-transitory computer-readable recording medium that stores therein a computer program product, which, when executed by a processor, causes the method according to embodiment 20 or 21 to be performed.

23. Single channel receiver comprising processing circuitry configured to:
receive an analog input signal,
down-mix the analog input signal by use of a phase- and/or frequency-corrected oscillator frequency signal,
shift complex-valued information contained in the analog input signal to the real part to obtain an intermediate real-valued analog signal,
convert the intermediate analog signal into an intermediate digital signal,
demodulate the intermediate digital signal into a digital output signal,
detect zero-crossings in the intermediate digital signal to obtain phase error information representing a phase error in the intermediate digital signal, and
generate the phase- and/or frequency-corrected oscillator frequency signal by use of the phase error information.

24. Single channel receiver comprising processing circuitry configured to:
receive an analog input signal,
down-mix the analog input signal by use of a phase- and/or frequency-corrected oscillator frequency signal,
shift complex-valued information contained in the analog input signal to the imaginary part to obtain an intermediate real-valued analog signal,
convert the intermediate analog signal into an intermediate digital signal,
demodulate the intermediate digital signal into a digital output signal,
detect zero-crossings in the intermediate digital signal to obtain phase error information representing a phase error in the intermediate digital signal, and
generate the phase- and/or frequency-corrected oscillator frequency signal by use of the phase error information.

25. A computer program comprising program code means for causing a computer to perform the steps of said method according to embodiment 20 or 21 when said computer pro-gram is carried out on a computer.

The invention claimed is:

1. A single channel receiver comprising:
an input terminal configured to receive an analog input signal,
an RF mixer configured to down-mix the analog input signal to an intermediate frequency by use of a phase- and/or frequency-corrected oscillator frequency signal and to shift complex-valued information contained in the analog input signal only to a real part, or only to an imaginary part to obtain an intermediate real-valued analog signal,
an analog-to-digital-converter configured to convert the intermediate real-valued analog signal into an intermediate digital signal,
a demodulator configured to demodulate the intermediate digital signal into a digital output signal,
a phase tracking loop configured to detect zero-crossings in the intermediate digital signal to obtain phase error information representing a phase error in the intermediate digital signal, wherein the phase tracking loop includes a zero-crossing detector configured to detect a timing of zero-crossings between two consecutive symbols of the intermediate digital signal, a timing tracking loop configured to detect signal shape distortions in the digital output signal to obtain timing error information representing a sample timing error in the digital output signal, and an oscillator configured to generate the phase- and/or frequency-corrected oscillator frequency signal by use of the phase error information, wherein the timing tracking loop includes a decision-directed phase error detector configured to compare amplitudes of the digital output signal at predetermined timings between two consecutive symbols of the digital output signal, wherein a first output of the demodulator is provided as a first input to the zero-crossing detector of the phase tracking loop, wherein a second output of the demodulator is provided as a first input to the decision-directed phase error detector of the timing tracking loop, and wherein an output of the decision-directed phase error detector of the timing tracking loop is provided as a second input to the demodulator.

2. The single channel receiver as claimed in claim 1, wherein the zero-crossing detector is configured to determine that there is no phase offset in a first case where the zero-crossing is in the middle between the two consecutive symbols and to determine that there is a phase offset in a second case where the zero-crossing is not arranged in the middle between the two subsequent symbols.

3. The single channel receiver as claimed in claim 2, wherein the zero-crossing detector is configured to determine an amount of the phase offset by detecting a position of the zero-crossing between the two consecutive symbols.

4. The single channel receiver as claimed in claim 3, wherein the zero-crossing detector is configured to determine the amount of the phase offset based on amplitudes of the two consecutive symbols.

5. The single channel receiver as claimed in claim 4, wherein the zero-crossing detector is configured to determine the amount of the phase offset by comparing and normalizing the amplitudes of the two consecutive symbols to an expected amplitude value to obtain a timing offset value which is proportional to the phase error.

6. The single channel receiver as claimed in claim 1, wherein the phase tracking loop further includes a loop filter configured to control phase error compensation.

7. The single channel receiver as claimed in claim 1, wherein the RF mixer is configured to shift the complex-valued information of the analog input signal to the real part or the imaginary part, respectively, by binary phase shift keying.

8. The single channel receiver as claimed in claim 1, wherein the decision-directed phase error detector is configured to compare amplitudes of the digital output signal after a quarter and after three quarters of a time period between two consecutive symbols of the digital output signal and/or to compare average amplitudes of the digital output signal at predetermined timing periods between the two consecutive symbols of the digital output signal.

9. The single channel receiver as claimed in claim 1, wherein the demodulator includes a first down-converter configured to down-convert the sampling rate of the intermediate digital signal and/or to re-sample to a fractional sampling rate.

10. The single channel receiver as claimed in claim 9, wherein the first down-converter is configured to down-convert the sampling rate of the intermediate digital signal by use of the timing error information.

11. The single channel receiver as claimed in claim 9, wherein the demodulator further includes a second down-converter configured to further down-convert the down-converted sampling rate of the intermediate digital signal down-converted by the first down-converter and/or a delay circuit coupled between the output of the first down-converter and the decision-directed phase error detector configured to delay the output signal of the first down-converter.

12. The single channel receiver as claimed in claim 9, wherein the demodulator further includes a hard decision detector configured to detect the bits of the digital output signal as hard decision and/or a differential decoder configured to decode the bits of the digital output signal.

13. The single channel receiver as claimed in claim 1, wherein the oscillator is configured to generate the phase- and/or frequency-corrected oscillator frequency signal by compensating the phase and/or frequency error in the intermediate digital signal by correcting the phase of the oscillator frequency signal by use of the phase error information.

14. The single channel receiver as claimed in claim 1, wherein the first output of the demodulator is provided as a second input to the decision-directed phase error detector of the timing tracking loop.

15. The single channel receiver as claimed in claim 14, wherein the first output of the demodulator is provided as a second input to the decision-directed phase error detector of the timing tracking loop indirectly via a delay.

16. A single channel receiver comprising:

an input terminal configured to receive an analog input signal, an RF mixer configured to down-mix the analog input signal to an intermediate frequency by use of a phase- and/or frequency-corrected oscillator frequency signal and to shift complex-valued information contained in the analog input signal only to an imaginary part to obtain an intermediate real-valued analog signal, an analog-to-digital-converter configured to convert the intermediate real-valued analog signal into an intermediate digital signal, a demodulator configured to demodulate the intermediate digital signal into a digital output signal, a phase tracking loop configured to detect zero-crossings in the intermediate digital signal to obtain phase error information representing a phase error in the intermediate digital signal, wherein the phase tracking loop includes a zero-crossing detector configured to detect a timing of zero-crossings between two consecutive symbols of the intermediate digital signal, a timing tracking loop configured to detect signal shape distortions in the digital output signal to obtain timing error information representing a sample timing error in the digital output signal, and an oscillator configured to generate the phase- and/or frequency-corrected oscillator frequency signal by use of the phase error information, wherein the timing tracking loop includes a decision-directed phase error detector configured to compare amplitudes of the digital output signal at predetermined timings between two consecutive symbols of the digital output signal, wherein a first output of the demodulator is provided as a first input to the zero-crossing detector of the phase tracking loop and a second output of the demodulator downstream of the first output is provided as a first input to the decision-directed phase error detector of the timing tracking loop, and wherein an output of the decision-directed phase error detector of the timing tracking loop is provided as a second input to the demodulator.

17. A single channel receiving method comprising:

receiving an analog input signal, down-mixing, using an RF mixer, the analog input signal to an intermediate frequency by use of a phase- and/or frequency-corrected oscillator frequency signal, shifting complex-valued information contained in the analog input signal only to the real part or only to the imaginary part to obtain an intermediate real-valued analog signal, converting the intermediate real-valued analog signal into an intermediate digital signal, demodulating, using a demodulator, the intermediate digital signal into a digital output signal, detecting, using a zero-crossing detector of a phase tracking loop, zero-crossings in the intermediate digital signal to obtain phase error information representing a phase error in the intermediate digital signal by detecting a timing of zero-crossings between two consecutive symbols of the intermediate digital signal, detecting, using a timing tracking loop, signal shape distortions in the digital output signal to obtain timing error information representing a sample timing error in the digital output signal, and generating the phase- and/or frequency-corrected oscillator frequency signal by use of the phase error information, wherein the timing tracking loop includes a decision-directed phase error detector configured to compare amplitudes of the digital output signal at predetermined timings between two consecutive symbols of the digital output signal, wherein a first output of the demodulator is provided as a first input to the zero-crossing detector of the phase tracking loop and a second output of the demodulator downstream of the first output is provided as a first input to the decision-directed phase error detector of the timing tracking loop, and wherein an output of the decision-directed phase error detector of the timing tracking loop is provided as a second input to the demodulator.

18. A non-transitory computer-readable recording medium that stores therein a computer program product, which, when executed by a processor, causes the method according to claim 17 to he performed.

19. A single channel receiving method comprising:

receiving an analog input signal, down-mixing, using an RF mixer, the analog input signal to an intermediate signal by use of a phase- and/or frequency-corrected oscillator frequency signal, shifting complex-valued information contained in the analog input signal only to the imaginary part to obtain an intermediate real-valued analog signal, converting the intermediate real-valued analog signal into an intermediate digital signal, demodulating, using a demodulator, the intermediate digital signal into a digital output signal, detecting, using a zero-crossing detector of a phase tracking loop, zero-crossings in the intermediate digital signal to obtain phase error information representing a phase error in the intermediate digital signal by detecting a timing of zero-crossings between two consecutive symbols of the intermediate digital signal, detecting, using a timing tracking loop, signal shape distortions in the digital output signal to obtain timing error information representing a sample timing error in the digital output signal, and generating the phase- and/or frequency-corrected oscillator frequency signal by use of the phase error information, wherein the timing tracking loop includes a decision-directed phase error detector configured to compare amplitudes of the digital output signal at predetermined timings between two consecutive symbols of the digital output signal, wherein a first output of the demodulator is provided as a first input to the zero-crossing detector of the phase tracking loop, wherein a second output of the demodulator is provided as a first input to the decision-directed phase error detector of the timing tracking loop, wherein an output of the decision-directed phase error detector of the timing tracking loop is provided as a second input to the demodulator.

20. The single channel receiving method as claimed in claim 19, wherein the first output of the demodulator is provided as a second input to the decision-directed phase error detector of the timing tracking loop.

* * * * *